United States Patent
Paulig et al.

(10) Patent No.: US 8,668,172 B2
(45) Date of Patent: Mar. 11, 2014

(54) HOLDING DEVICE FOR A SPRINKLER NOZZLE

(75) Inventors: Gerd Paulig, Ölbronn-Dürrn (DE); Jochen Schmitt, Malsch (DE)

(73) Assignee: Witzenmann GmbH, Pforzheim (DE)

( * ) Notice: Subject to any disclaimer, the term of this patent is extended or adjusted under 35 U.S.C. 154(b) by 708 days.

(21) Appl. No.: 12/558,749

(22) Filed: Sep. 14, 2009

(65) Prior Publication Data

US 2010/0065698 A1    Mar. 18, 2010

(30) Foreign Application Priority Data

Sep. 13, 2008   (DE) ..................... 20 2008 012 120 U

(51) Int. Cl.
 *F16L 3/08*       (2006.01)
(52) U.S. Cl.
 USPC ................ 248/65; 248/49; 248/58; 248/63; 248/67.7; 248/72; 248/73; 248/75; 248/300
(58) Field of Classification Search
 CPC .......... E04B 9/00; A62C 35/68; A62C 35/58; F16L 3/24
 USPC ............. 248/49, 58, 63, 65, 67.7, 72, 73, 75, 248/300; 239/282, 283, 208, 209; 169/5–22; 285/64; 24/20 R, 23 B, 23 EE, 24/23 R; 52/39
 See application file for complete search history.

(56) References Cited

U.S. PATENT DOCUMENTS

| | | | | |
|---|---|---|---|---|
| 2,642,243 A | * | 6/1953 | Kindorf | 248/72 |
| 3,034,185 A | * | 5/1962 | Olsen | 403/347 |
| 3,066,903 A | * | 12/1962 | Tinnerman | 248/300 |
| 3,341,909 A | * | 9/1967 | Havener | 24/486 |
| 3,612,461 A | * | 10/1971 | Brown | 248/317 |
| 3,652,780 A | * | 3/1972 | Wilson | 174/45 R |
| 4,674,720 A | * | 6/1987 | Fetsch | 248/74.1 |
| 4,713,863 A | * | 12/1987 | Jennings | 24/20 R |
| 4,717,099 A | * | 1/1988 | Hubbard | 248/57 |
| 4,958,792 A | * | 9/1990 | Rinderer | 248/74.2 |
| 5,533,696 A | * | 7/1996 | Laughlin et al. | 248/74.2 |
| 5,667,181 A | * | 9/1997 | van Leeuwen et al. | 248/343 |
| 6,260,810 B1 | * | 7/2001 | Choi | 248/65 |
| 6,341,466 B1 | | 1/2002 | Kehoe et al. | |

(Continued)

FOREIGN PATENT DOCUMENTS

| | | |
|---|---|---|
| DE | 1988003 | 6/1968 |
| JP | 07004567 | 1/1995 |
| JP | 11063310 | 3/1999 |
| JP | 2000002369 | 1/2000 |

*Primary Examiner* — Terrell McKinnon
*Assistant Examiner* — Michael McDuffie
(74) *Attorney, Agent, or Firm* — Volpe and Koenig, P.C.

(57) ABSTRACT

A holding device (1) for a sprinkler nozzle (17) of a sprinkler system is provided, wherein the holding device has a first bracket (2) and a second bracket (3) that are connected to each other at one of their ends and that extend parallel to each other at least in an assembled state of the holding device (1). Each bracket has a structure (10, 11) for receiving a sprinkler nozzle (17), and the receiving structures (10, 11) are formed for receiving the sprinkler nozzle (17) oriented perpendicular to the two brackets (2, 3). The two brackets (2, 3) have, at their free ends opposite the one end, complementary catch structures (5, 6) by which the two brackets (2, 3) can be locked with each other in the assembled state.

10 Claims, 3 Drawing Sheets

(56) References Cited

U.S. PATENT DOCUMENTS

| | | | |
|---|---|---|---|
| 6,460,813 B1 * | 10/2002 | Gretz | 248/62 |
| 6,637,710 B2 * | 10/2003 | Yaphe et al. | 248/317 |
| 6,811,130 B1 * | 11/2004 | Oh | 248/343 |
| 7,240,884 B2 * | 7/2007 | Shim | 248/342 |
| 7,264,214 B2 * | 9/2007 | Oh | 248/342 |
| 7,427,051 B2 * | 9/2008 | Oh | 248/73 |
| 7,455,268 B2 * | 11/2008 | Heath | 248/74.1 |
| 7,506,845 B2 * | 3/2009 | Oh | 248/73 |
| 7,614,590 B2 * | 11/2009 | Boville | 248/72 |
| 7,735,787 B2 * | 6/2010 | Kafenshtok et al. | 248/75 |
| 7,845,599 B2 * | 12/2010 | Jackson | 248/73 |
| 2008/0083852 A1 | 4/2008 | Oh | |
| 2008/0083853 A1 | 4/2008 | Oh | |

\* cited by examiner

HOLDING DEVICE FOR A SPRINKLER NOZZLE

CROSS-REFERENCE TO RELATED APPLICATIONS

This application claims the benefit of German patent application No. 20 2008 012 120.5, filed Sep. 13, 2008, which is incorporated herein by reference as if fully set forth.

BACKGROUND

The present invention relates to a holding device for a sprinkler nozzle of a sprinkler system with a first bracket and with a second bracket that extend parallel to each other at least in an assembled state of the holding device and that are connected to each other at their one end, wherein each of these brackets has a structure for receiving a sprinkler nozzle of the sprinkler system.

Such holding devices are known and are also regularly called holding clamps. For example, US 2008/0083852 A1 discloses a holding device according to the class that, however, due to their special construction, can be used only with specially shaped or constructed carrier structures of a sprinkler system or corresponding sprinkler nozzles.

Other previously known holding devices have the disadvantage that, especially for the use of sprinkler nozzles with large sprinkler rosettes or sprinkler guards, it is regularly necessary to attach the mentioned rosettes or guards only after the holding device is mounted, which makes a subsequent tightness test necessary. However, because the assembly of ceiling systems, including the carrier structures for sprinkler nozzles, regularly represents the completion of a building project, an advantageous goal is to perform the mentioned tightness test already before installation of the ceiling system or carrier structures for the sprinkler system.

Finally, multiple-part holding devices are also known that, however, suffer from relatively poor handling especially in the case of overhead assembly.

SUMMARY

The invention is based on the problem of providing, as an improvement to the holding device named above, an easy-to-manufacture and easy-to-handle holding device that can also be used for sprinkler nozzles that have been completely assembled and tested for tightness already with rosettes or guards of practically any shape.

This objective is met by a holding device with the features of the invention. Advantageous improvements of the holding device according to the invention are described in detail below and in the claims.

According to the invention, a holding device for a sprinkler nozzle of a sprinkler system is provided, wherein this holding device comprises a first and a second bracket that are connected to each other at one of their ends and that extend parallel to each other at least in an assembled state of the holding device, wherein each of these brackets has a structure for receiving a sprinkler nozzle, and the receiving structures are constructed for receiving a sprinkler nozzle oriented perpendicular to the two brackets, and the two brackets have, at the free ends opposite the one end, complementary catch structures by which the two brackets can be locked to each other in the assembled state.

The term "assembled state" should be understood here and below as that state of the holding device according to the invention in which the two brackets are engaged with each other with their complementary catch structures, so that the two brackets of the holding device extend parallel to each other, in which state the holding device according to the invention is being used or can be used for fixing a sprinkler nozzle of a sprinkler system to a corresponding carrier structure, wherein the sprinkler nozzle is oriented perpendicular to the two brackets, i.e., the parallel bracket planes defined here.

Accordingly, one special feature of the holding device according to the invention is provided in that this holding device features, on one hand, the previously described closed assembled state and, on the other hand, a correspondingly open "as-delivered condition," in which the complementary catch structures of the two brackets are each free, so that an opening remains between the two brackets, wherein, with this opening, the holding device according to the invention could be pushed onto the already mentioned carrier structure of the sprinkler system. Then the holding device according to the invention can be closed by locking the complementary catch structures, wherein the assembled state is reached by this process. The mentioned carrier structure, e.g., a square pipe, is then held at least in some sections between the brackets of the holding device and secures a sprinkler nozzle oriented perpendicular to the brackets in that they press and fix this nozzle in place advantageously in the direction of the connection area of the two brackets.

Advantageously, the holding device is further constructed so that the previously described closing during the assembling of the holding device can be performed with one hand by the technician, which means a significant improvement in handling, especially in the case of overhead work, compared with other previously known holding devices that had disadvantageous constructions with two or more parts.

One advantageous improvement of the holding device according to the invention provides that the structure for receiving the sprinkler nozzle is constructed as at least one recess opening toward the free end of the bracket in each of the two brackets. In this way, each of the two brackets is formed from at least two sub-brackets that extend essentially parallel to each other and parallel to the corresponding sub-brackets of the corresponding other bracket. According to the definition, the mentioned recess opens laterally with respect to the holding device, so that also completely preassembled sprinkler nozzles with practically any size rosette or guard or covered sprinkler heads can be fixed, without requiring a later tightness test.

Thus, initially the completely preassembled sprinkler nozzle oriented perpendicular to the brackets is inserted laterally from the outside into the recess(es). Then the holding device together with the sprinkler nozzle is pushed onto a carrier structure similarly running perpendicular to the sprinkler nozzle, wherein the carrier structure steps through the opening between the two brackets or the corresponding sub-brackets. Finally, the holding device is closed by locking, so that the carrier structure prevents slippage of the sprinkler nozzle out of the recess or the recesses.

Another improvement of the holding device according to the invention provides that each of the mentioned sub-brackets has corresponding, complementary catch structures.

In order to be able to transfer an optionally quantitatively required torque between the sprinkler nozzle or sprinkler collar on one hand and the holding device on the other hand, it is provided, in the scope of another improvement of the holding device according to the invention, that the recess has at least partially internal contours that correspond to external contours of the sprinkler nozzle or sprinkler collar.

As already mentioned, the two brackets of the holding device according to the invention are connected to each other at one end. In the scope of a different construction of the holding device according to the invention, this occurs via a third bracket, so that, at least in the assembled state, a U-shaped cross-sectional profile of the holding device is produced (in the as-delivered condition, the holding device according to the invention has, instead, a V-shaped cross-sectional profile). Here, the distance between the two brackets essentially corresponds to a corresponding dimension of a carrier structure of the sprinkler system, in particular, the thickness of a square pipe of the sprinkler system used as a carrier structure. In this way, the holding device can be easily pushed onto the carrier structure of the sprinkler system by the already mentioned opening between the two brackets in the as-delivered condition and can then be closed by simply pressing the brackets together.

In the course of another improvement of the holding device according to the invention, it is provided that, for reinforcement, at least one of the two brackets has at least one reinforcement structure in the form of a seam or chamfer. If—as described—first and second brackets with several sub-brackets are used, advantageously there is at least one reinforcement structure for each sub-bracket. The mentioned reinforcement structures are advantageously formed along the extent of the corresponding bracket or sub-bracket.

For forming the already mentioned complementary catch structures, another construction of the holding device according to the invention provides that the mentioned catch structures are formed, on one side, from a bend of the first bracket inward in the direction of the second bracket and, on the other side, from an angle of the second bracket in the direction of the first bracket with terminal backwards bend of the second bracket outward in the direction of the angle. In the assembled state, here the second bracket engages with its backward bend in the bend of the first bracket, so that the already described locking is realized.

Another improvement of the holding device according to the invention provides that a dimension of the angle essentially corresponds to the distance between the two brackets in the assembled state of the device.

In order to use the holding device after it has been successfully closed for fixing a sprinkler nozzle to a corresponding carrier structure, another improvement of the invention provides that, in the region of the angle, at least one threaded structure is provided for screwing in a screw, in particular, a self-tapping screw. Here, the threaded structure could be arranged such that the screw is guided essentially parallel to the two brackets in the assembled state. The screw can then be screwed in from the outside into the threaded structure and thus provides for a positive-fit or non-positive-fit connection between the holding device, on one side, and the other elements of the sprinkler system, namely the sprinkler nozzle and the carrier structure that has already been mentioned several times, wherein these other elements are arranged in the area between the brackets or in the region of the recess, in that it presses the carrier structure against the sprinkler nozzle and further presses this in the direction of the third bracket or the connection end of the first and second brackets of the holding device. Here, the provision of several sub-brackets each with their own screw is advantageous for receiving torque.

The single or multiple screws is or are advantageously held captive in the mentioned threaded structures in the as-delivered condition.

BRIEF DESCRIPTION OF THE DRAWINGS

Additional properties and advantages of the present invention emerge from the following description of embodiments with reference to the drawings. In the drawings.

DETAILED DESCRIPTION OF THE PREFERRED EMBODIMENTS

Figure 1:
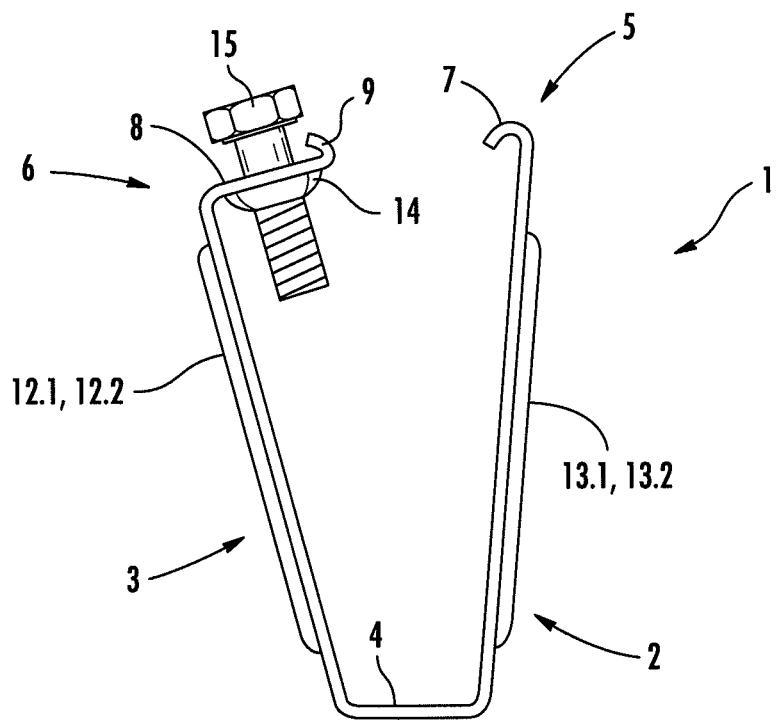
FIG. 1 is a side view of the holding device according to the invention in the open, as-delivered condition.

A holding device according to the invention is indicated in its entirety with the reference symbol 1 in the figures described below. FIG. 1 shows a side view of the holding device 1 in its open state, the so-called as-delivered condition, which will be discussed in even more detail farther below. The as-delivered condition differs from the closed assembled state of the holding device 1, as shown, for example, in FIG. 3, which will likewise be discussed in even more detail farther below.

The holding device 1 is formed from a first bracket 2 and a second bracket 3 that are connected to each other essentially like the letter U or, in the case of the open state according to FIG. 1, like the letter V via a third bracket 4. At their free ends, the first bracket 2 and the second bracket 3 each have complementary catch structures 5 and 6, respectively, which will be discussed in more detail below.

In the case of the first bracket 2, the catch structure 5 is formed by a bend 7 of the first bracket 2 inward with respect to the holding device 1 and in the direction of the second bracket 3. In the case of the second bracket 3, the catch structure 6 is formed from an angle 8 of the second bracket 3 at a right angle to its extent and bent inward toward the holding device 1, that is, in the direction of the first bracket 2. A terminal backwards bend 9 of the second bracket 3 connects to the angle 8 of the second bracket 3 outward with respect to the holding device 1, so that the already mentioned complementary catch structures 5 and 6 are formed, wherein, for locking, the second bracket 3 engages, with its backwards bend 9, behind the bend 7 of the first bracket 2. This is shown in even more detail in FIGS. 3 and 5.

Figure 2:
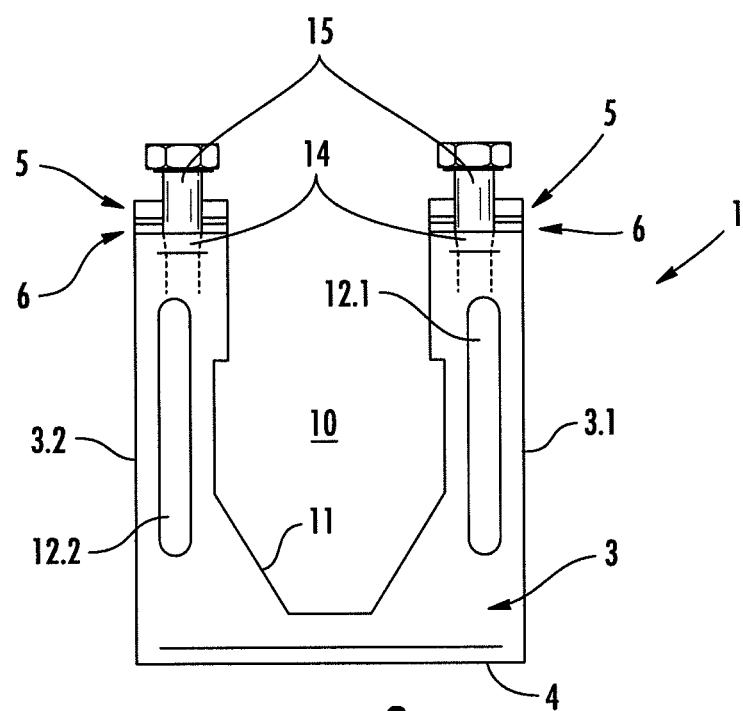
FIG. 2 is a top view of the holding device according to the invention.
Figure 4:
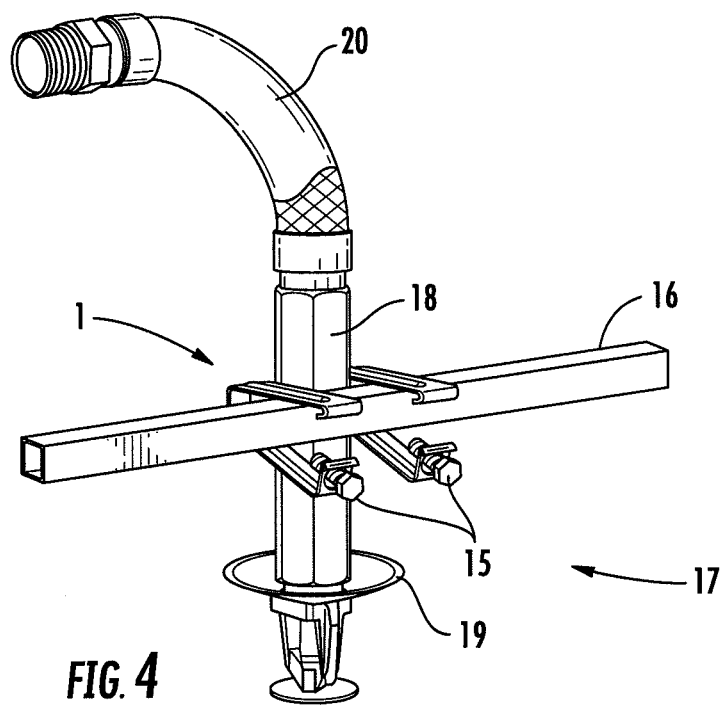
FIG. 4 is a view showing the use of the holding device according to the invention for fixing a sprinkler nozzle to a carrier structure of a sprinkler system, wherein the holding device is located in its open state.
Figure 5:
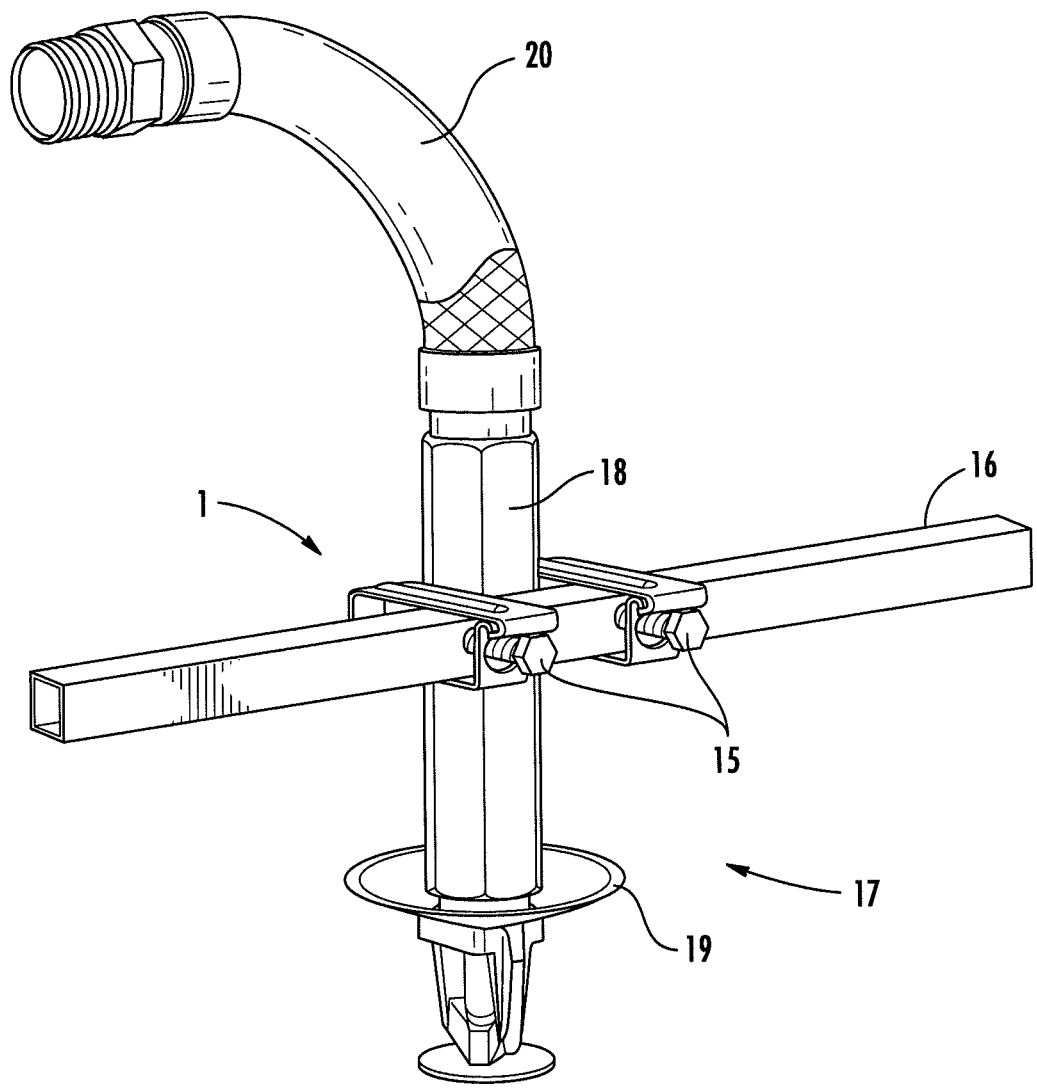
FIG. 5 is a view according to FIG. 4 with the holding device in its closed state.

As the top view according to FIG. 2 illustrates, the holding device 1 has, in the second bracket 3 and also congruently in the first bracket 2 behind the second bracket, a recess 10 that is used according to FIGS. 4 and 5 for receiving a sprinkler nozzle or a corresponding collar, which is to be discussed in more detail. The recess 10 opens outward in the region of the catch structures 5, 6, so that from there, the mentioned sprinkler nozzle can be inserted laterally into the recess 10 of the holding device 1 or the holding device 1 can be pushed laterally onto a sprinkler nozzle, when the sprinkler nozzle is oriented perpendicular to the planes of the brackets 2, 3 (cf. FIGS. 4 and 5).

The recess 10 has polygonal internal contours 11 that are advantageously adapted to corresponding external contours of the sprinkler nozzle, so that a corresponding positive-fit connection is produced between the holding device 1 and the sprinkler nozzle in the region of the recess 10, which is advantageous when a torque is applied in the course of fastening measures to the sprinkler nozzle.

The formation of the previously described recess 10 open laterally, i.e., toward the free end of the brackets 2, 3 leads to the result that the second bracket 3 of the holding device 1 shown in FIG. 2 and accordingly also the (not visible) first bracket 2 (cf. FIG. 1) are each formed from two sub-brackets 3.1, 3.2 parallel to each other. Each of the two sub-brackets 3.1, 3.2 has, on its free end, the catch structure 6 described above, while the sub-bracket of the first bracket 2 not shown in FIG. 2 has, on each of its free ends, the catch structure 5 also described above that interacts with the catch structure 6 of the second bracket 3.

Each of the sub-brackets 3.1, 3.2 has, along its extent, a reinforcement structure in the form of a seam 12.1, 12.2 for reinforcement purposes. A corresponding situation is also valid for the first bracket 2; the seams present there can be seen, for example, in FIG. 1 and in FIG. 3 and are designated there with the reference symbols 13.1, 13.2.

With reference to FIG. 1 again, the holding device 1 has, in the region of the angle 8 of the second bracket 3, a threaded structure 14 that is formed in the advantageously metallic base material of the holding device 1 and that is used for the captive holding or screwing in of a screw means 15 in the form of a self-tapping screw. Its function will be discussed in even more detail farther below with reference to FIG. 5. As additionally to be taken from FIG. 2, the threaded structure 14 is present on each of the two sub-brackets 3.1, 3.2.

Figure 3:
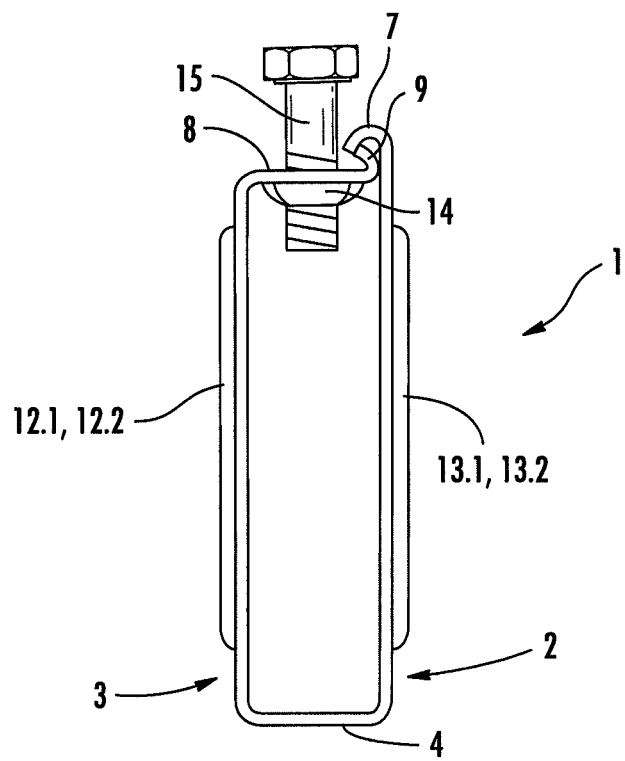
FIG. 3 is a side view essentially corresponding to FIG. 1 of the holding device according to the invention in the closed assembled state.

The already mentioned FIG. 3 shows the holding device 1 according to FIG. 1 in its closed state that is also designated as the assembled state. Here, the second bracket 3 engages with its backwards bend 9 behind or in the bend 7 of the first bracket 2, so that the first bracket 2 and the second bracket 3 of the holding device 1 are locked with each other. In this assembled state, the two brackets 2, 3 of the holding device 1 extend parallel to each other. The screw-in direction of the screw 15 is, in the assembled state of the holding device according to FIG. 1, oriented parallel both to the first bracket 2 and also to the second bracket 3 and runs in the direction of the third, middle bracket 4 of the holding device 1.

As already indicated several times, the holding device 1 is advantageously formed from metal sheet whose material type and/or material thickness are selected so that the holding device 1 can be bent by hand from the as-delivered condition shown in FIG. 1 into the assembled state according to FIG. 3. It has been shown that, in this connection it is advantageous to form the holding device with a sheet thickness of only 1.25 mm. Due to the orientation of the two brackets of the holding device perpendicular to the sprinkler nozzle, however, this does not negatively affect the stability of the arrangement.

As already discussed above, the holding device 1 is used to attach a sprinkler nozzle or a sprinkler collar to a carrier structure of a sprinkler system. Such carrier structures are usually constructed as square pipes with an edge length of, for example, 15 mm, as shown by the reference symbol 16 in the FIGS. 4 and 5. Furthermore, by the reference symbol 17, a sprinkler nozzle with collar 18, rosette 19, and connection line 20 is shown. The sprinkler collar 18 has polygonal, in particular, hexagonal external contours to which the holding device 1 are adapted with the internal contours 11 of its recess 10, as described in detail farther above with reference to FIG. 2. The lengths of the third bracket 4 and the angle 8 are advantageously adapted to the edge length of the square pipe 16, as shown.

As shown in FIGS. 4 and 5, for the use of the holding device 1 according to the invention, the sprinkler nozzle 17 that has been completely assembled and optionally already tested for tightness is fixed to the carrier structure 16, in that the holding device 1 located in its open state according to FIG. 1 is pushed laterally in the region of the collar 18 over the nozzle 17 onto the square pipe 16, wherein the square pipe 16 steps through the opening between the first and second brackets or the corresponding sub-brackets of the holding device 1 that are not labeled explicitly in FIGS. 4 and 5 for reasons of clarity. The nozzle 17 is then arranged with its collar 18 between the third bracket 4 of the holding device 1 and the carrier structure 16.

Then the holding device 1 is closed by locking (cf. FIG. 5), so that the assembled state is reached. Then, by tightening the screw 15 against the square pipe 16, the final fixing of the sprinkler nozzle 17 is realized both in the horizontal and also in the vertical direction.

One essential advantage of the holding device 1 according to the invention is given in this connection from its complete, one-piece construction, so that a technician could position the sprinkler nozzle 17 with one hand, while he attaches and closes the holding device 1 with the other hand and then tightens the screw 15. Here, the sprinkler nozzle 17 could be—as already mentioned—completely preassembled and tested for its tightness, which is significant, in particular, because often in the construction of buildings the ceiling systems including the carrier structures are assembled only after final completion of the construction work, so that subsequent tightness testing is undesired. This would then be the case if, due to the holding device that is used, the rosette 19 or similar add-on parts could be mounted only after fixing the collar 18 on the square pipe 16, which is prevented by the previously described holding device 1.

The invention claimed is:

1. Holding device (1) for a sprinkler nozzle (17) of a sprinkler system, the holding device comprises a first bracket (2) and a second bracket (3) that are connected to each other at respective first ends and that extend parallel to each other at least in an assembled state of the holding device (1), each of the brackets has a receiving structure (10, 11) for receiving a sprinkler nozzle (17), the receiving structures (10, 11) are constructed for receiving a sprinkler nozzle (17) oriented perpendicular to an extension direction of the two brackets (2, 3), which defines a sprinkler nozzle mounting axis, and the two brackets (2, 3) have, at respective free ends thereof opposite the first ends, complementary catch structures (5, 6) adapted for movement in a direction generally parallel to an axis of the sprinkler nozzle mounting axis between an open position and a closed position by which the two brackets (2, 3) can be locked with each other in the assembled state, wherein the complementary catch structures are formed, on one side, from a bend (7) of the first bracket (2) inward in a direction of the second bracket (3) and, on the other side, from an angle (8) of the second bracket (3) in a direction of the first bracket (2) with a terminal backwards bend (9) of the second bracket (3) outward in a direction of the angle (8), and in an assembled state, the backwards bend (9) of the second bracket (3) engages with the bend (7) of the first bracket (2), and in a portion of the angle (8), there is at least one threaded structure (14) for screwing in a screw (15) that is adapted to contact a carrier structure, and the threaded structure (14) is arranged such that the screw (15) is guided essentially parallel to the two brackets (2, 3) in the assembled state.

2. Holding device (1) according to claim 1, wherein the receiving structures for receiving the sprinkler nozzle (17) are constructed as at least one recess (10) in each of the two brackets (2, 3), so that each of the two brackets (2, 3) is formed from at least two sub-brackets (3.1, 3.2).

3. Holding device (1) according to claim 2, wherein each sub-bracket (3.1, 3.2) has corresponding catch structures (6).

4. Holding device (1) according to claim 2, wherein the recesses (10) have, at least partially, internal contours (11) that correspond to external contours (18) of the sprinkler nozzle (17).

5. Holding device (1) according to claim 1, wherein the two brackets (2, 3) are connected to each other by a third bracket (4), so that, at least in the assembled state, a U-shaped cross-sectional profile of the holding device (1) is produced, and a distance between the two brackets (2, 3) corresponds to a corresponding dimension of a carrier structure of the sprinkler system.

6. Holding device (1) according to claim 1, wherein at least one of the two brackets (2, 3) has at least one reinforcement structure (13.1, 13.2; 12.1, 12.2).

7. Holding device (1) according to claim 1, wherein a dimension of the angle (8) essentially corresponds to a distance or to a dimension of a carrier structure of the sprinkler system.

8. Holding device (1) according to claim 1, wherein the screw (15) is constructed as a self-tapping screw.

9. Holding device (1) according to claim 1, wherein before assembly, the holding device (1) is provided in an open, as-delivered condition in which the catch structures (5, 6) are free and the two brackets (2, 3) extend at an angle to each other, so that, in a region of the free ends, an opening remains between the two brackets (2, 3), wherein, via use of the opening, the holding device (1) can be placed on a carrier structure.

10. Holding device (1) according to claim 2, wherein at least one reinforcement structure (13.1, 13.2; 12.1, 12.2) is provided for each of the sub-brackets (3.1, 3.2) that is constructed along its extent.

\* \* \* \* \*